United States Patent
Dutkiewicz et al.

(10) Patent No.: US 6,598,562 B1
(45) Date of Patent: Jul. 29, 2003

(54) PET POOL SAFETY SYSTEM

(76) Inventors: Edward P. Dutkiewicz, 4205 Kent Dr., Largo, FL (US) 33774-1018; Cynthia G. Dutkiewicz, 4205 Kent Dr., Largo, FL (US) 33774-1018

(*) Notice: Subject to any disclaimer, the term of this patent is extended or adjusted under 35 U.S.C. 154(b) by 46 days.

(21) Appl. No.: 10/253,015

(22) Filed: Sep. 24, 2002

(51) Int. Cl.[7] ............................. A01K 15/02; E06C 1/08
(52) U.S. Cl. ............................................. 119/706; 182/93
(58) Field of Search ........................... 119/712, 702, 119/705, 706, 847, 28.5; 182/93, 115, 116

(56) References Cited

U.S. PATENT DOCUMENTS

| | | | | |
|---|---|---|---|---|
| 2,579,797 A | * | 12/1951 | Churchfield et al. | 119/28.5 |
| 2,641,785 A | * | 6/1953 | Pitts et al. | 14/71.1 |
| 3,173,398 A | * | 3/1965 | Raymond | 119/28.5 |
| 3,618,568 A | * | 11/1971 | Breeden | 119/482 |
| 3,891,053 A | * | 6/1975 | Burton | 182/97 |
| 4,186,820 A | * | 2/1980 | Cosman | 182/93 |
| 4,418,792 A | * | 12/1983 | Cerone | 182/93 |
| 4,538,314 A | * | 9/1985 | Baranowski | 14/71.1 |
| 4,630,709 A | * | 12/1986 | Taylor | 182/48 |
| 5,065,840 A | * | 11/1991 | Cadigan | 182/93 |
| 5,333,323 A | * | 8/1994 | Aymes | 4/496 |
| 5,592,801 A | * | 1/1997 | Balzer | 52/741.2 |
| 5,634,440 A | * | 6/1997 | Mogck | 119/847 |
| 5,829,380 A | * | 11/1998 | Smith | 114/362 |
| 6,321,689 B1 | * | 11/2001 | Fulmer | 119/706 |

* cited by examiner

*Primary Examiner*—Yvonne Abbott

(57) ABSTRACT

A pet pool safety system comprising several components in combination. First provided is a platform which is fabricated of a water resistant material. The platform has a generally rectilinear configuration with a plurality of pin receivers, a plurality of struts and a plurality of U-shaped ladder clamps. The platform also has two buoy apertures. Next provided is a ramp which is fabricated of a water proof material. The ramp has a generally rectilinear configuration with a plurality of raised ridges and a pin passageway. Next provided is a ramp pin which is sized to be received by the pin receivers and the round pin passageway thereby rotatably coupling the ramp to the platform. Next provided is a plurality of float subassemblies with each having a rod with an upper stop and a float. Lastly there is provided a pool side ladder.

6 Claims, 3 Drawing Sheets

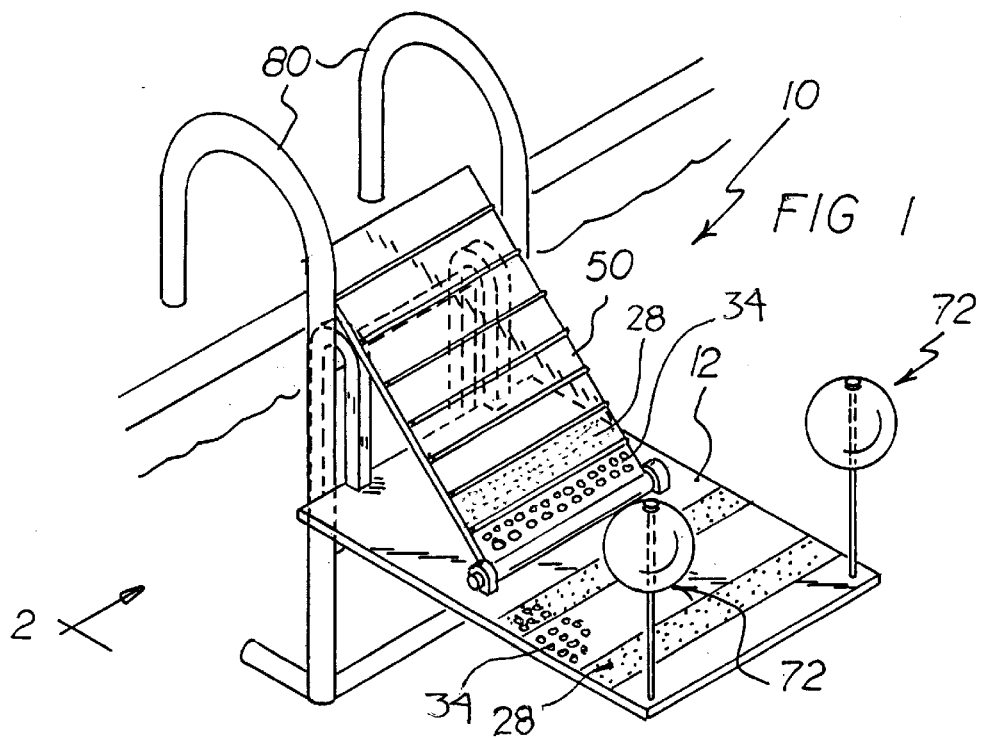
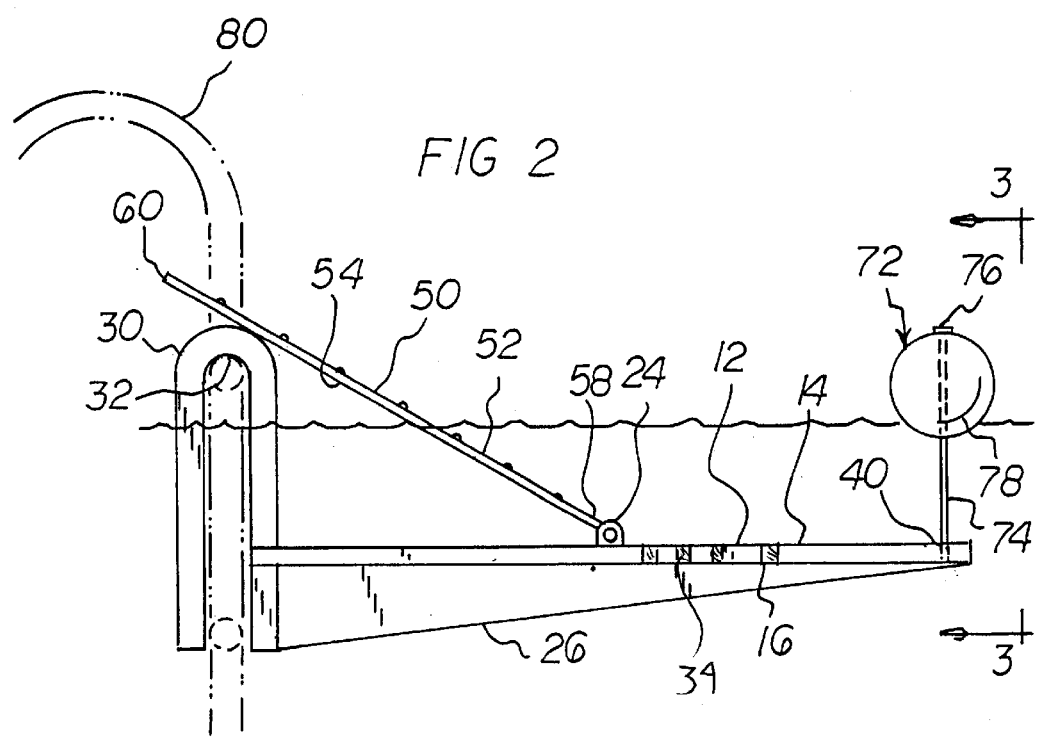

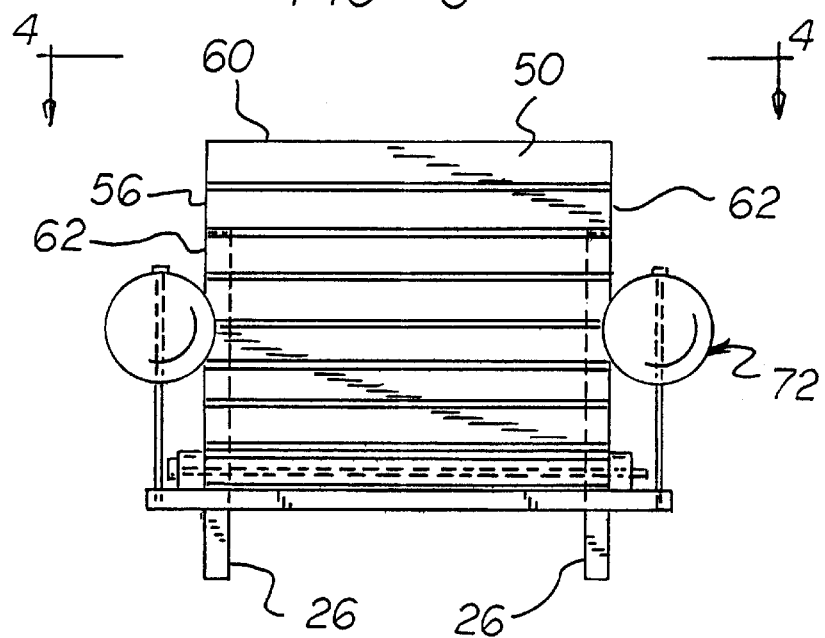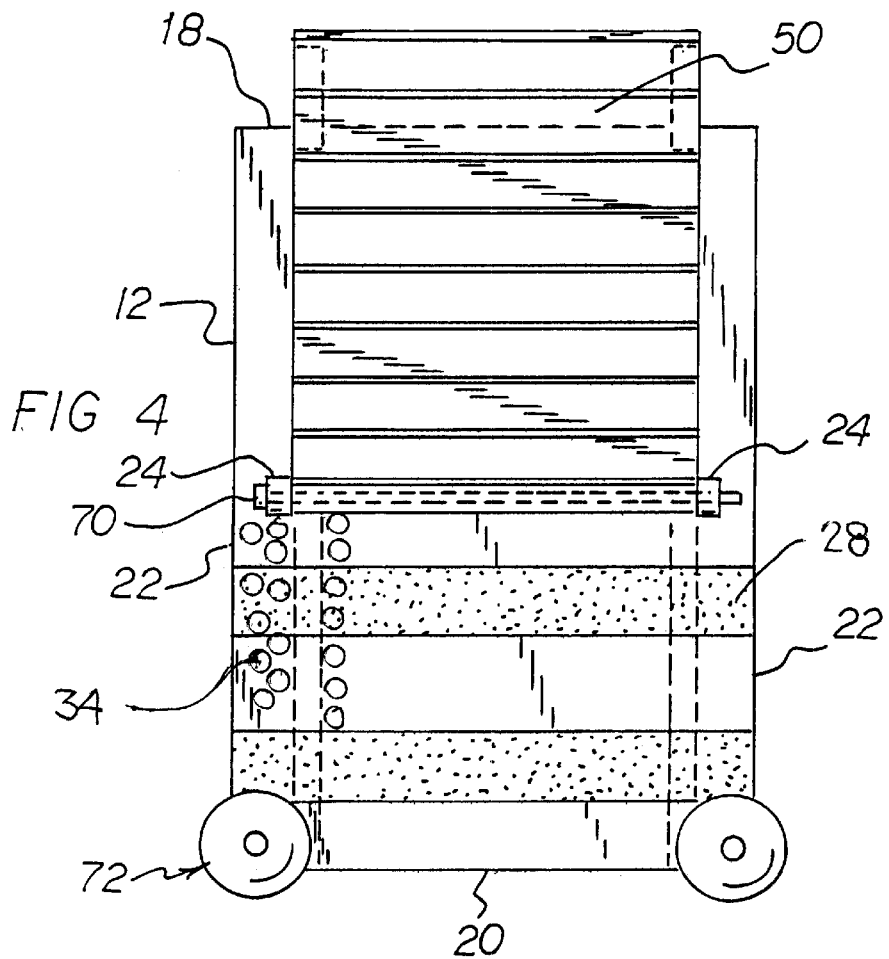

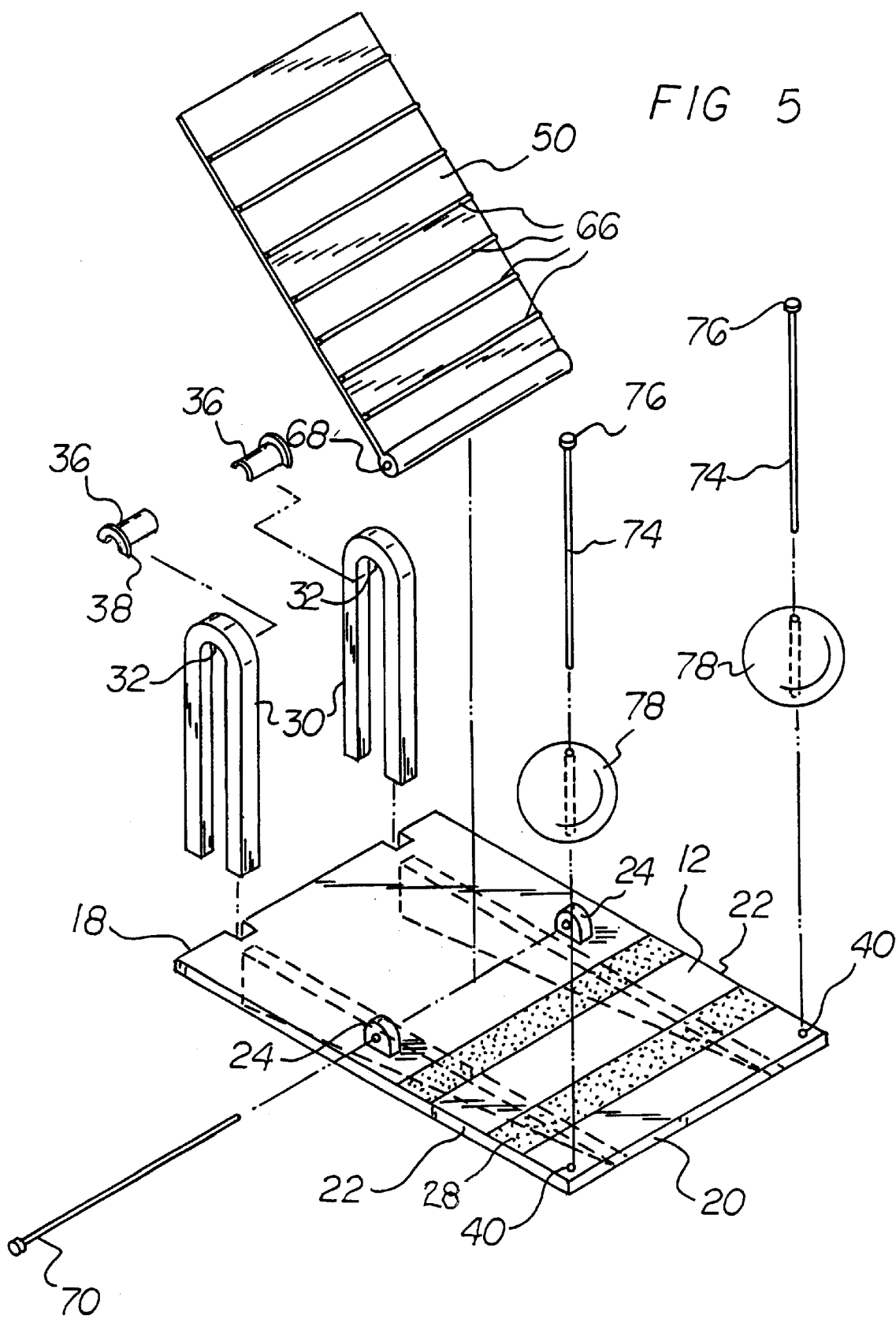

PET POOL SAFETY SYSTEM

BACKGROUND OF THE INVENTION

1. Field of the Invention

The present invention relates to a pet pool safety system and more particularly pertains to a allowing a pet to safely and easily exit a swimming pool.

2. Description of the Prior Art

The use of other devices of known and expected methods of assuring pet pool safety is known in the prior art. More specifically, other devices of known and expected methods of assuring pet pool safety previously devised and utilized for the purpose of using known methods and apparatuses of providing a pet pool exiting system are known to consist basically of familiar, expected, and obvious structural configurations, notwithstanding the myriad of designs encompassed by the crowded prior art which has been developed for the fulfillment of countless objectives and requirements.

While the expected and obvious configurations and devices fulfill their respective, particular objectives and requirements, they do not describe pet pool safety system that allows pet safely and easily exiting a swimming pool.

In this respect, the pet pool safety system according to the present invention substantially departs from the conventional concepts and designs of the prior art, and in doing so provides an apparatus primarily developed for the purpose of allowing a pet to safely and easily exit a swimming pool.

Therefore, it can be appreciated that there exists a continuing need for a new and improved pet pool safety system which can be used for allowing a pet to safely and easily exit a swimming pool. In this regard, the present invention substantially fulfills this need.

SUMMARY OF THE INVENTION

In view of the foregoing disadvantages inherent in the known types of other devices of known and expected methods of assuring pet pool safety now present in the prior art, the present invention provides an improved pet pool safety system. As such, the general purpose of the present invention, which will be described subsequently in greater detail, is to provide a new and improved pet pool safety system and method which has all the advantages of the prior art and none of the disadvantages.

To attain this, the present invention essentially comprises a pet pool safety system for allowing a pet to safely and easily exit a swimming pool. The system comprises, in combination, several components. First provided is a platform. The platform is fabricated of a water resistant, preferably synthetic, material such as a plastic or fiberglass. The platform has a generally rectilinear configuration. It has an upper surface and a lower surface. The platform has a wall end and a pool end and two side ends disposed there between. The upper surface of the platform has a plurality of pin receivers. The pin receivers are located at the approximate midpoint of the length of the upper surface. Each pin receiver has a passageway of between about ¼ and 1 inch in diameter there through. The lower surface of the platform has a plurality of struts running from the wall end to the pool end. Each of the struts have a triangular shape, with the wide end of the strut coupling to the wall end of the platform. In an alternative embodiment the platform and ramp may be coated with a non-slip surface to aid the pet in maintaining traction of the surface of the platform and the ramp. In another alternative embodiment of the invention, the platform and ramp may have a plurality of holes having an internal diameter of between about ¼ and ¾ inch to reduce overall weight and to provide a gripping surface for the pet. In another alternative embodiment, the ramp and platform upper surface may have a series of markings to make the surface more easily visible to an animal in the pool. The wall end of the platform has a plurality of ladder clamps. Each ladder clamp has a general U-shaped configuration. The opening of the U-shape is directed downward. Each of the ladder clamps is coupled to the platform and a strut. Each ladder clamp has a length of between about 18 and 24 inches and a width of between about 2 and 5 inches. The U-shape has an internal recess rung opening with an internal width of between about 1 and 3 inches to accept the external diameter of a pool ladder rung. The platform has two buoy apertures. Each of the bouy aperture s is between about ¼ and ¾ of an inch in internal diameter and is located at each of the pool ends of the platform. Next provided is a ramp. The ramp is fabricated of water proof material, such as the type utilized to fabricate the platform. The ramp has a generally rectilinear configuration. It has an upper surface and a lower surface and an edge disposed there between. The ramp has a pool end and a wall end and two side edges there between. The upper surface of the ramp has a plurality of raised ridges for allowing an animal to retain traction on the ramp. The pool end of the ramp has a round pin passageway running from side edge to side edge. The pin passageway has an internal diameter of between about ¼ and 1 inch. Next provided is a ramp pin. The ramp pin is fabricated of rigid water proof material. It has a round cylindrical configuration with an external diameter of between about ¼ and 1 inch. The ramp pin is sized to be received by the pin receivers of the platform and the round passageway of the ramp. The pin rotatably couples the ramp to the platform. Next provided is a plurality of float subassemblies. Each float subassembly has a rod having a round solid cylindrical configuration with an upper stop. Each rod is sized to be securely received and held in the buoy apertures of the platform. Each subassembly also has a float with a central hole which allows the float to move up and down the rod while being retained on the rod by the upper stop. Lastly provided is a pool side ladder.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved pet pool safety system which has all of the advantages of the prior art other devices of known and expected methods of assuring pet pool safety and none of the disadvantages.

It is another object of the present invention to provide a new and improved pet pool safety system which may be easily and efficiently manufactured and marketed.

It is further object of the present invention to provide a new and improved pet pool safety system which is of durable and reliable constructions.

An even further object of the present invention is to provide a new and improved pet pool safety system which is susceptible of a low cost of manufacture with regard to both materials and labor, and which accordingly is then susceptible of low prices of sale to the consuming public, thereby making such pet pool safety system economically available to the buying public.

Even still another object of the present invention is to provide a pet pool safety system for allowing a pet to safely and easily exit a swimming pool.

Lastly, it is an object of the present invention to provide a new and improved pet pool safety system comprising several components in combination. First provided is a platform which is fabricated of a water resistant material. The platform has a generally rectilinear configuration with a plurality of pin receivers, a plurality of struts and a plurality of U-shaped ladder clamps. The platform also has two buoy apertures. Next provided is a ramp which is fabricated of a water proof material. The ramp has a generally rectilinear configuration with a plurality of raised ridges and a pin passageway. Next provided is a ramp pin which is sized to be received by the pin receivers and the round pin passageway thereby rotatably coupling the ramp to the platform. Next provided is a plurality of float subassemblies with each having a rod with an upper stop and a float. Lastly there is provided a pool side ladder.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective demonstrating the pet pool ramp system employed at a pool side ladder.

FIG. 2 is a side elevation view of the system.

FIG. 3 is a side elevation taken along the line identified as line 3—3 of FIG. 2.

FIG. 4 is a top planar view taken along the line identified as line 4—4 of FIG. 3.

FIG. 5 is an exploded view of the system.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved pet pool safety system embodying the principles and concepts of the present invention and generally designated by the reference numeral 10 will be described.

The present invention, the pet pool safety system 10 is comprised of a plurality of components. Such components in their broadest context include a platform, a ramp, a plurality of mounting ladder clamps and a means for aiding the pet in identifying the exit, such as stripes on the platform and ramp surfaces. Such components are individually configured and correlated with respect to each other so as to attain the desired objective.

A pet pool safety system 10 for allowing a pet to safely and easily exit a swimming pool. The system comprises, in combination, several components.

First provided is a platform 12. The platform is fabricated of a water resistant, preferably synthetic, material such as a plastic or fiberglass. The platform has a generally rectilinear configuration. It has an upper surface 14 and a lower surface 16. The platform has a wall end 18 and a pool end 20 and two side ends 22 disposed there between.

The upper surface of the platform has a plurality of pin receivers 24. The pin receivers are located at the approximate midpoint of the length of the upper surface. Each pin receiver has a passageway of between about ¼ and 1 inch in diameter there through.

The lower surface of the platform has a plurality of struts 26 running from the wall end to the pool end. Each of the struts have a triangular shape, with the wide end of the strut coupling to the wall end of the platform.

In an alternative embodiment the platform and ramp may be coated with a non-slip surface 28 to aid the pet in maintaining traction of the surface of the platform and the ramp. In another alternative embodiment of the invention, the platform and ramp may have a plurality of holes 34 having an internal diameter of between about ¼ and ¾ inch to reduce overall weight and to provide a gripping surface for the pet. And in a third alternative embodiment, the upper surfaces of the ramp and the platform may be marked to aid the pet in visualizing the submerged platform and therefore the exit from the pool.

The wall end of the platform has a plurality of ladder clamps 30. Each ladder clamp has a general U-shaped configuration. The opening of the U-shape is directed downward. Each of the ladder clamps is coupled to the platform and a strut. Each ladder clamp has a length of between about 18 and 24 inches and a width of between about 2 and 5 inches.

The U-shape has an internal recess rung opening 32 with an internal width of between about 1 and 3 inches to accept the external diameter of a pool ladder rung. In an alternative embodiment the system may also include a plurality of rung opening spacers 36. The spacers are configured and sized to fit within the dimensions of the internal recess rung opening. Each of the spacers have a U-shaped configuration with a flange 38 on the side to prevent side to side movement of the spacer once in place.

The platform has two buoy apertures 40. Each of the buoy apertures is between about ¼ and ¾ of an inch in internal diameter and is located at each of the pool ends of the platform.

Next provided is a ramp 50. The ramp is fabricated of a water proof material, such as the type utilized to fabricate the platform. The ramp has a generally rectilinear configuration. It has an upper surface 52 and a lower surface 54 and an edge 56 disposed there between.

The ramp has a pool end 58 and a wall 60 end and two side edges 62 there between. The upper surface of the ramp has a plurality of raised ridges 66 for allowing an animal to retain traction on the ramp. The pool end of the ramp has a round pin passageway 68 running from side edge to side edge. The pin passageway has an internal diameter of between about ¼ and 1 inch.

Next provided is a ramp pin 70. The ramp pin is fabricated of rigid water proof material. It has a round cylindrical configuration with an external diameter of between about ¼ and 1 inch. The ramp pin is sized to be received by the pin receivers of the platform and the round passageway of the ramp. The pin rotatably couples the ramp to the platform.

Next provided is a plurality of float subassemblies 72. Each float subassembly has a rod 74 having a round solid cylindrical configuration with an upper stop 76. Each rod is sized to be securely received and held in the buoy apertures of the platform. Each subassembly also has a float 78 with a central hole which allows the float to move up and down the rod while being retained on the rod by the upper stop. Lastly provided is a pool side ladder 80.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A pet pool safety system for allowing a pet to safely and easily exit a swimming pool comprising, in combination:

a platform fabricated of a water resistant material having a generally rectilinear configuration with an upper surface and a lower surface with a wall end and a pool end and two side ends disposed there between, with the upper surface of the platform having a plurality of pin receivers located at the approximate midpoint of the length of the upper surface with each pin receiver having a passageway of between about ¼ and 1 inch in diameter there through, with the lower surface of the platform having a plurality of struts running from the wall end to the pool end with the struts each having a triangular shape with the wide end of the strut coupling to the wall end of the platform, the wall end of the platform having a plurality of ladder clamps each clamp having a general U shaped configuration with the opening of the U shape being directed downward and with each ladder clamp being coupled to the platform and a strut, with each ladder clamp having a length of between about 18 and 24 inches and a width of between about 2 and 5 inches and the U shape having an internal recess rung opening with an internal width of between about 1 and 3 inches to accept the external diameter of a pool ladder rung, with the platform having two buoy apertures being between about ¼ and ¾ of an inch in internal diameter located at each of the pool ends of the platform;

a ramp fabricated of water proof material having a generally rectilinear configuration with a upper surface and a lower surface and an edge disposed there between, with the ramp having a pool end and a wall end and two side edges there between, with the upper surface of the ramp having a plurality of raised ridges for allowing an animal to retain traction on the ramp, with the pool end of the ramp having a round pin passageway running from side to side with the pin passageway having an internal diameter of between about ¼ and 1 inch;

a ramp pin fabricated of rigid water proof material and having a round cylindrical configuration with an external diameter of between about ¼ and 1 inch and sized to be received by the pin receivers of the platform and the round passageway of the ramp, the pin rotatably coupling the ramp to the platform;

a plurality of float subassemblies, with each float subassembly having a rod having a round solid cylindrical configuration with an upper stop, with each rod sized to be securely received and held in the bouy apertures of the platform, with each subassembly also having a float with a central hole which allows the float to move up and down the rod while being retained on the rod by the upper stop; and, a pool side ladder.

2. A pet pool safety system comprising, in combination:

a platform fabricated of a water resistant material having a generally rectilinear configuration and having a plurality of pin receivers and a plurality of struts and a plurality of U-shaped ladder clamps and two buoy apertures;

a ramp fabricated of water proof material having a generally rectilinear configuration with a plurality of raised ridges and a pin passageway;

a ramp pin sized to be received by the pin receivers and the round pin passageway rotatably coupling the ramp to the platform;

a plurality of float subassemblies with each having a rod with an upper stop and a float; and, a pool side ladder.

3. A pet pool safety system as described in claim 2 wherein the system further comprises a solid U-shaped ladder rung spacer with the spacer having an outer flange on one side for allowing the user to raise the level of the platform in the pool.

4. A pet pool safety system as described in claim 2 wherein the system further comprises a plurality of holes through the platform and the ramp to aid the pet in maintaining traction of the platform and ramp surface.

5. A pet pool safety system as described in claim 2 wherein the system further comprises a non-slip surface on the upper surface of the ramp and the platform to aid the pet in maintaining traction of the surface of the platform and the ramp.

6. A pet pool safety system as described in claim 2 wherein the system further comprises an alternating surface coloration on the upper surface of the ramp and the platform to aid the pet in locating the platform and the ramp while in the water.

* * * * *